United States Patent [19]
Seki et al.

[11] Patent Number: 6,034,944
[45] Date of Patent: Mar. 7, 2000

[54] COMMUNICATION SYSTEM

[75] Inventors: Yutaka Seki, Hino; Keiichi Obara, Hachioji; Tomoo Kunikyou; Hidekazu Turuta, both of Tokyo; Hirotaka Sakajiri, Kashiwa, all of Japan

[73] Assignee: Kabushiki Kaisha Toshiba, Kanagawa, Japan

[21] Appl. No.: 08/860,025

[22] PCT Filed: Nov. 11, 1996

[86] PCT No.: PCT/JP96/03305

§ 371 Date: Jul. 3, 1997

§ 102(e) Date: Jul. 3, 1997

[87] PCT Pub. No.: WO97/17782

PCT Pub. Date: May 15, 1997

[30] Foreign Application Priority Data

Nov. 10, 1995 [JP] Japan ................................ 7-293098

[51] Int. Cl.⁷ .................................................. H04L 12/28
[52] U.S. Cl. ........................................... 370/224; 370/440
[58] Field of Search .................................. 370/222, 223, 370/216, 392, 431, 434, 224, 364, 365, 440

[56] References Cited

U.S. PATENT DOCUMENTS 4,561,088  12/1985  Champlin et al. ................. 370/222
5,049,871  9/1991  Sturgis et al. ..................... 370/223

FOREIGN PATENT DOCUMENTS

| 55-47530 | 4/1980 | Japan . |
| 60-91744 | 5/1985 | Japan . |
| 60-223249 | 11/1985 | Japan . |
| 4-181839 | 6/1992 | Japan . |
| 4-291857 | 10/1992 | Japan . |
| 6-326728 | 11/1994 | Japan . |

*Primary Examiner*—Dang Ton
*Assistant Examiner*—Tuan Q Ho
*Attorney, Agent, or Firm*—Finnegan, Henderson, Farabow, Garrett & Dunner, L.L.P.

[57] ABSTRACT

A communication system capable of reliably recovering its communication functions on its own when a fault occurs, and which can be used to construct a highly flexible network. This communication system is configured so that a plurality of node devices (12) supporting data generating sources are connected via communication paths (13) that use ATM technology to a plurality of center devices (11), just as if it possessed distributed ATM switch functions. When the communication paths (13) between two (2) node devices (12-2 and 12-3) are cut, the center device (11-2) detects the fault point, and autonomously recovers communication functions by transferring the node device (12-2) originally under its control to the control of the center device (11-1). When this happens, the center device 11-2) cannot communicate via the communication paths (13) due to the fault, and must use a local communication means such as a wide area network (16) to communicate with the center device (11-1).

13 Claims, 14 Drawing Sheets

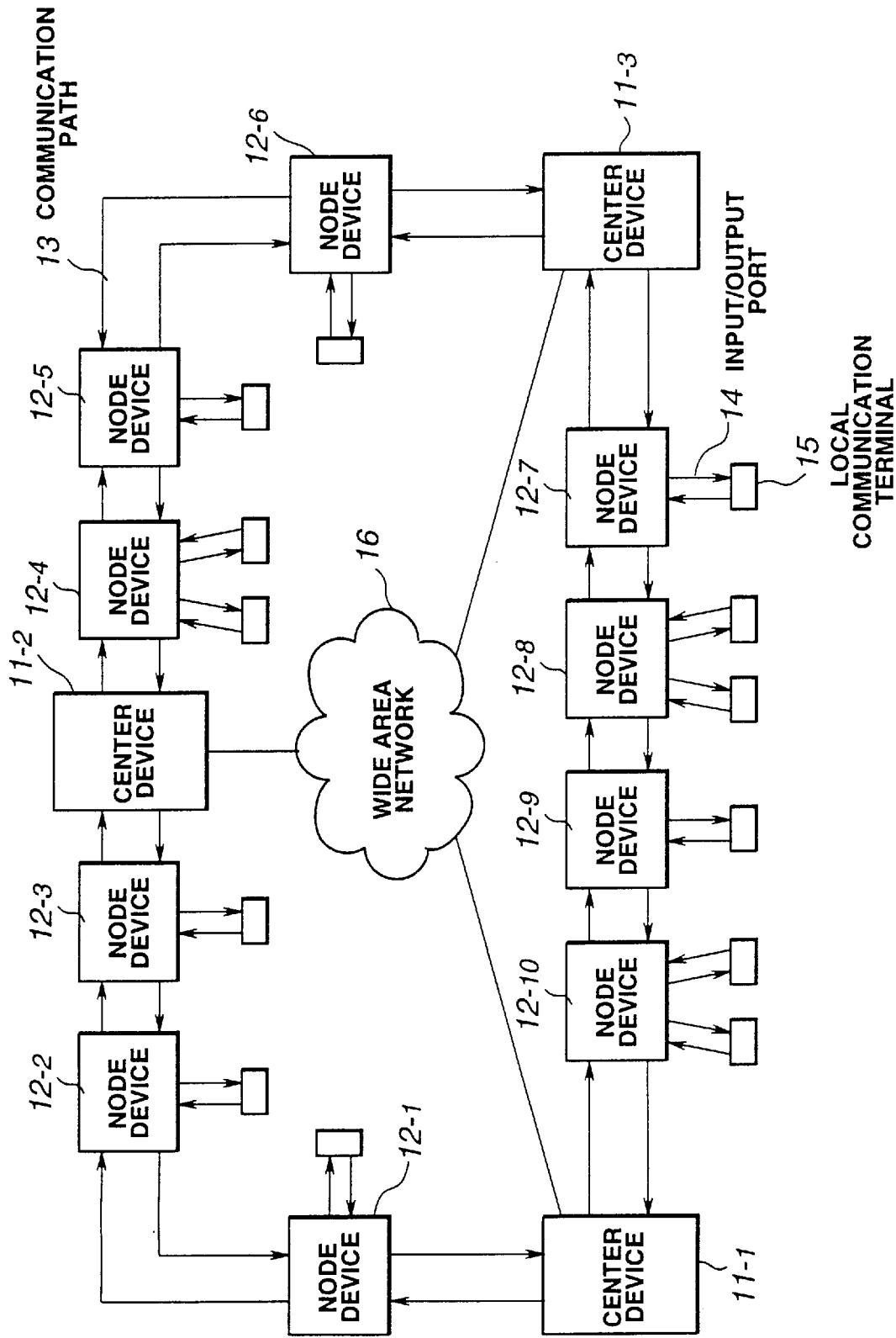

FIG.7(a)

| TABLE NO. | NODE DEVICE NAME | CONTROL CENTER DEVICE |
|---|---|---|
| 0 | 12-1 | 11-1 |
| 1 | 12-2 | 11-2 |
| 2 | 12-3 | 11-2 |

FIG.7(b)

| TABLE NO. | NODE DEVICE NAME | CONTROL CENTER DEVICE |
|---|---|---|
| 0 | 12-1 | 11-1 |
| 1 | 12-2 | 11-2 |
| 2 | 12-3 | 11-2 |
| 3 | 12-4 | 11-2 |
| 4 | 12-5 | 11-2 |
| 5 | 12-6 | 11-3 |

FIG.7(c)

| TABLE NO. | NODE DEVICE NAME | CONTROL CENTER DEVICE |
|---|---|---|
| 0 | 12-6 | 11-3 |
| 1 | 12-5 | 11-2 |
| 2 | 12-4 | 11-2 |

FIG.7(d)

| TABLE NO. | NODE DEVICE NAME | CONTROL CENTER DEVICE |
|---|---|---|
| 0 | 12-1 | 11-1 |
| 1 | 12-2 | 11-1 |
| 2 | 12-3 | 11-2 |

FIG.7(e)

| TABLE NO. | NODE DEVICE NAME | CONTROL CENTER DEVICE |
|---|---|---|
| 0 | 12-1 | 11-1 |
| 1 | 12-2 | 11-1 |
| 2 | 12-3 | 11-2 |
| 3 | 12-4 | 11-2 |
| 4 | 12-5 | 11-2 |
| 5 | 12-6 | 11-3 |

FIG.8

| TABLE NO. | NODE DEVICE NAME | LOCAL COMMUNICATION TERMINAL NAME | CONTROL CENTER DEVICE |
|---|---|---|---|
| 0 | 12-1 | 15-1 | 11-1 |
| 1 | 12-1 | 15-2 | 11-1 |
| 2 | 12-2 | 15-3 | 11-2 |
| ⋮ | ⋮ | ⋮ | ⋮ |
| 5 | 12-2 | 15-6 | 11-2 |
| 6 | 12-3 | 15-7 | 11-2 |
| 7 | 12-4 | 15-8 | 11-2 |
| 8 | 12-4 | 15-9 | 11-3 |
| 9 | 12-5 | 15-10 | 11-1,11-2 |
| 10 | 12-6 | 15-11 | 11-3 |

COMMUNICATION SYSTEM

TECHNICAL FIELD

The present invention relates to a communication system configured from a communication network which connects data generating sources and data receivers to data processing centers charged with the centralized control of these various devices when the data generating sources or data receivers are arranged in a straight line or a loop.

BACKGROUND ART

Typical examples of communication systems comprising data generating sources arranged in a straight line or a loop, these data generating sources being connected via transmission paths to data processing centers that centrally control these devices are railroad management systems, road management systems, sewer management systems, airport management systems, river management systems and subway management systems.

In a railroad management system, a control center exists within an administrative territory, monitoring cameras and train detection sensors are positioned along the railway within the administrative territory, and information from these cameras and sensors is collected at the control center. Signal devices and other means of communicating control information to trains are also positioned along the railway. Accident information from adjacent administrative territories is also collected at the control center, where various judgements are made using this information and the information from the administrative territory in question, and then based on the results of these judgements, the operation of the trains is controlled and other railway management procedures are implemented using signal devices and such.

As can be gleaned from this example of a railroad management system, with this type of communication system, information has been collected via communication lines connecting data generating sources to the control center on a one-to-one basis, and control of signal device displays has been implemented via communication lines running from the control center on a one-to-one basis. However, developments aimed at making asynchronous transfer mode (ATM) switching systems more practical have made rapid progress recently, and by applying this ATM technology to communication systems such as the one described above, it has become possible to construct flexible systems that make the most of the advantages offered by ATM.

FIG. 13 outlines the system configuration achieved by applying ATM technology to the various management systems described above, and more particularly, what happens when a fault occurs. This system is configured with a plurality of distributed switching components (92), which are connected to a center switching component (91) via transmission lines (93). If a fault (95) similar to the one indicated by the X in the figure were to occur in this system today, switching components (92-2 and 92-3) adjacent to the fault point (95) would each execute loopback, thereby making it possible for the system to autonomously recover communication functions via the route indicated in the figure by the dotted line.

Thus, it is possible for a system with the above-cited configuration to use loopback to maintain communications when a fault occurs, but when this communication system was applied to an actual railroad management system, the below-described problems arose. A railroad management system could be configured as shown in FIG. (14), comprising switching components (92-1–92-5) distributed along both sides of the railway (rail 100), a control center-based center switching component (91) that controls each of the switching components (92-1–92-5), this center switching component (91) being connected to each of the switching components (92-1~92-5) via loop-shaped transmission paths (93). Each of the switching components (92-1–92-5) is then equipped with input/output ports (94), with local communication terminals equivalent to the above-described monitoring cameras, train detection sensors and/or signal devices being supported via these input/output ports (94).

However, with this configuration, when an earthquake or some other disaster strikes and severs the railway, faults do not occur only in one place as indicated by the fault (95) shown in FIG. 13, but generally involve faults wherein the above-described loop is simultaneously cut in two locations opposite one another as with the fault (101) indicated in FIG. (14). When a situation of this sort occurs, switching components (92-1, 92-2 and 92-3) connected to the center switching component (91) via transmission paths (93) are capable of autonomously recovering communication functions by implementing the loopback described above, but switching components (92-4 and 92-5) on the other side, which are completely cut off by the breaks in the transmission paths (93), are unable to recover communication functions.

Instead of positioning switching components (92) in a loop along both incoming and outgoing railway lines (100), one possible method for configuring a system that overcomes this problem would be to construct loop-shaped networks for each railway line so that earthquake-caused faults would be limited to a single location. However, when loop-shaped networks have been constructed along railways, in some areas these loops have extended for several hundred kilometers, and have limited the response capabilities of conventional systems with only a single center switching component (91), resulting in a network that did not really possess the flexibility needed by a railroad management system.

Thus, with the conventional system described above, communication functions could be recovered autonomously by looping back to the center switching component from the switching components adjacent to the point where a fault occurred, but the fact that the basic configuration called for a plurality of distributed switching components to be controlled by a single center switching component was a problem in that the pattern of the generated fault often resulted in one of the loopback transmission paths to the center switching component being lost as described above, dealing a fatal blow to the autonomous recovery of communication functions.

Further, concerning the loss of the loopback transmission paths leading to the center switching component, this can be dealt with to a certain degree by redesigning the layout of the switching components, such as constructing a loop-shaped railway network, but the current practice of having only one center switching component limits the capabilities of a loop-shaped network that extends for several hundred kilometers, and this is a problem for railroad and other management systems in that the network lacks the flexibility to deal with changes.

An object of the present invention is to provide a communication system that is capable of doing away with the above-described problems, ensuring autonomous recovery of communication functions when faults occur, and enabling the construction of a highly flexible network with regard to various management and control requirements.

DISCLOSURE OF THE INVENTION

The present invention comprises a plurality of node devices distributed in a plurality of locations, one or a plurality of local communication terminals connected to each of the node devices, a plurality of center devices that control the node devices and local communication terminals, and facing communication path means that serially connect the node devices with the center devices, characterized in that the center devices transmit cells of data to the local communication terminals under their control using the communication path means, and the node devices receive the cells of data from the communication path means, extract relevant data from the received cells of data addressed to local communication terminals connected to the node devices and output this data to the pertinent local communication terminals, and transmit to the center devices via the communication path means cells of data from the local communication terminals connected to the node devices.

Ideally, the present invention is characterized in that the communication path means connects the node devices with the center devices linearly, and at least two of the plurality of center devices are positioned at either end of the pertinent linear communication path means.

Further, the communication path means connects the node devices and center devices in a loop.

Further, the center devices are interconnected via local communication means, and comprise the means for transmitting and receiving system configuration control information via the communication path means and local communication means, and for changing the scope of control of the node devices and local communication terminals.

Further, the center devices are interconnected via local communication means, and, when a fault occurs in a segment of the communication paths means, comprise the means for transmitting and receiving fault point information and system configuration control information via the local communication means, and for transferring node devices that are unable to communicate with a certain center device due to the fault to the control of another center device.

Further, the present invention is characterized in that it comprises means for detecting the occurrence of a fault in a segment of the communication path means, for interconnecting center devices via local communication means, for transmitting and receiving fault point information and system configuration control information via the local communication means, and for transferring node devices that are unable to communicate with a certain center device due to the fault to the control of another center device.

Further, the center devices are interconnected via local communication means, and, when a fault occurs in a segment of the communication paths means, comprise the means for transmitting and receiving fault point information and system configuration control information via communication path means or local communication means that were rerouted around the fault, and for transferring node devices that are unable to communicate with a certain center device due to the fault to the control of another center device.

Further, the present invention is characterized in that it comprises means for detecting the occurrence of a fault in a segment of the communication path means, for interconnecting center devices via local communication means, for transmitting and receiving fault point information and system configuration control information via the communication path means or local communication means that were rerouted around the fault, and for transferring node devices that are unable to communicate with a certain center device due to the fault to the control of another center device.

Further, the center devices specify the location of the fault based on fault cells containing pertinent node device information sent from the node devices.

Further, the node devices comprise means for detecting faults from the interruption of cell transmissions from center devices or upstream node devices, and is further characterized in that, when detects a fault, a node device transmits to center devices or downstream node devices via specified virtual channels fault cells containing information peculiar to itself.

Further, the node devices comprise means for constantly transmitting to downstream node devices at fixed intervals fault monitoring cells containing information peculiar to themselves and for detecting faults from the interruption of cell transmissions from upstream node devices, and is further characterized in that, when detects a fault, it transmits to center devices or downstream node devices via specified virtual channels fault cells containing information peculiar to itself.

Further, the node devices constantly transmit to the center devices at fixed intervals fault monitoring cells containing information peculiar to themselves, and is further characterized in that the center devices specify the location of faults from the interruption of transmissions of the fault monitoring cells from the node devices.

Further, the node devices, center devices and communication path means are achieved via ATM switch functions.

Thus, the present invention comprises a plurality of node devices that support data generating sources and a plurality of center devices interconnected via communication paths that utilize ATM technology, and is configured to enable the realization of distributed ATM switch functions. By using this configuration, when, for example, the communication path between a certain center device and a node device under its control is cut, it is possible to ensure the autonomous recovery of communication functions by transferring this node device to the control of a center device other than the original center device described above.

Further, because the above-described configuration, wherein a plurality of distributed node devices are controlled by a plurality of center devices, is equipped with functions that enable the configuration control data, which stipulates the node devices to be managed by each center device, to be suitably altered apart from the occurrence of the faults, this configuration can be applied to systems that require control which spans a plurality of center devices, and can easily deal with changes to the scope of that control, making it possible, for example, to construct an extremely flexible network for a railroad management system.

BRIEF DESCRIPTION OF THE DRAWINGS

FIG. 6 is a simplified block diagram of a communication system related to the second embodiment of the present invention;

FIGS. 7(a) to 7(e) provide examples of management tables for each of the center devices in the system shown in FIG. 1;

FIG. 8 shows an enlarged example of a management table presented in FIGS. 7(a) to 7(e);

BEST MODE FOR CARRYING OUT THE INVENTION

Figure 1:
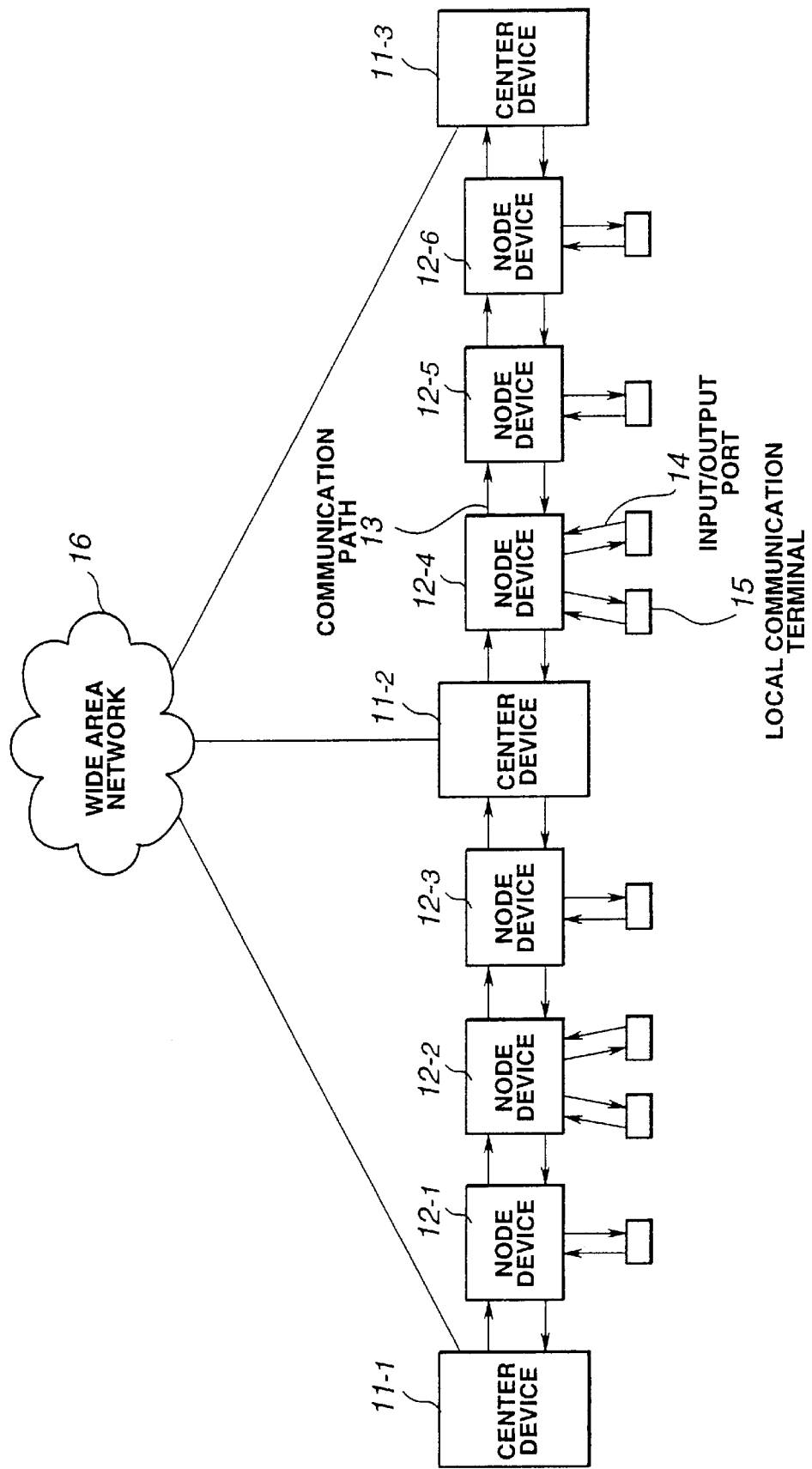
FIG. 1 is a simplified block diagram of a communication system related to the first embodiment of the present invention.

The following is a detailed explanation of the first embodiment of the present invention using the attached figures. FIG. 1 is a simplified block diagram of a communication system related to the first embodiment of the present invention. This communication system comprises three (3) center devices (11-1, 11-2, 11-3) and six (6) node devices (12-1, 12-2, 12-3, 12-4, 12-5, 12-6) connected linearly via facing communication paths (13). Further, the three (3) center devices (11-1, 11-2, 11-3) are interconnected via a wide area network (16).

The node devices (12) receive signals sent from upstream via the communication paths (13) and transmit them downstream, simultaneously exchanging signals with local communication terminals (15) via input/output ports (14). The center devices (11) perform required operational control by collecting via the communication paths (13) various data from the local communication terminals (15) connected to each of the node devices (12), and transmitting required control information sequentially via the plurality of node devices (12) to each targeted local communication terminal (15) utilizing the communication paths (13).

In particular, this system is premised on an ATM switched system that transmits all signals sent between the center devices (11), node devices (12) and local communication terminals (15) over the communication paths (13) as cells of data, and uses the node devices (12) distributed along the communication paths (13) to relay and switch the cells of data between the center devices (11) and the local communication terminals (15) connected to these node devices (12).

Figure 2:
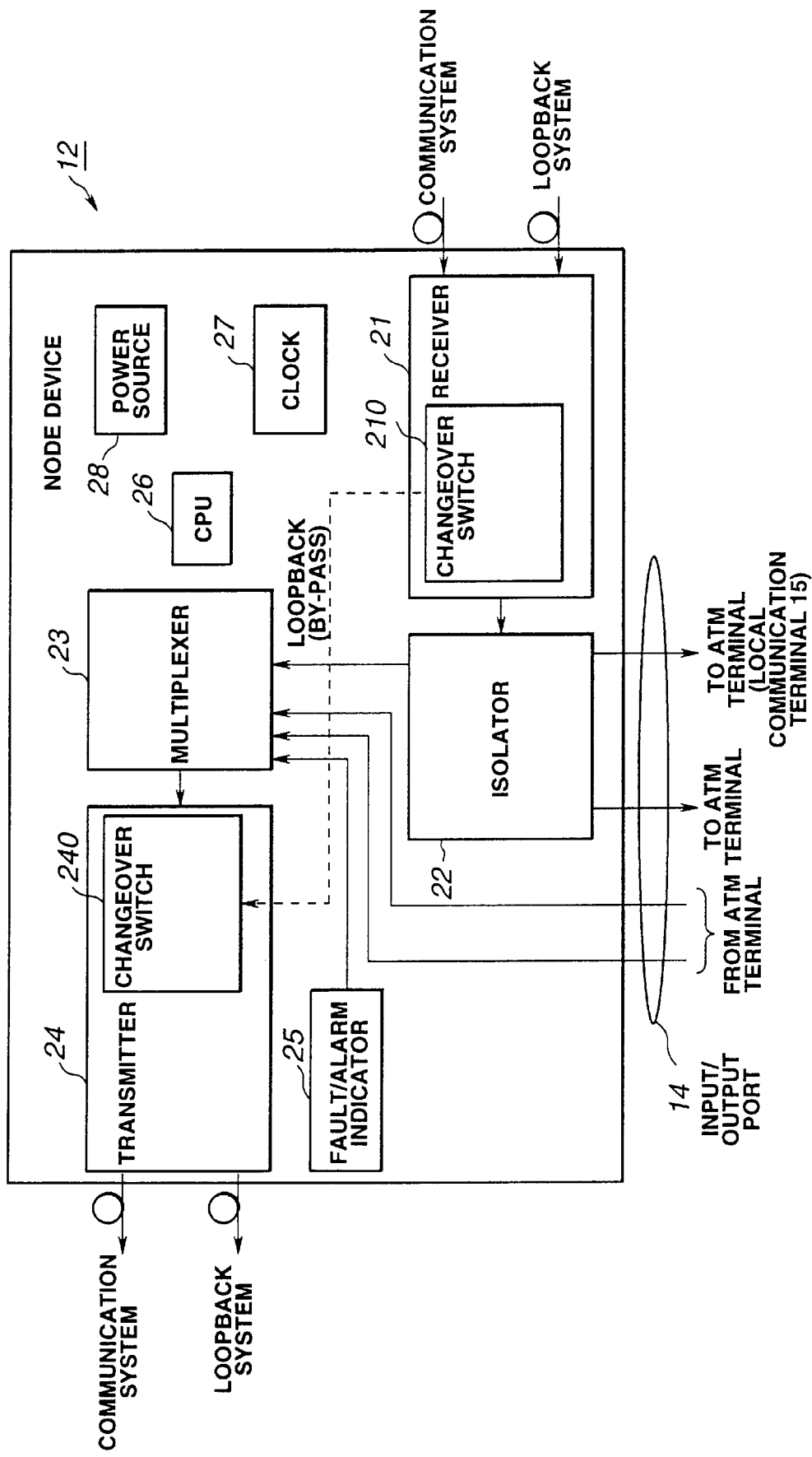
FIG. 2 depicts the configuration of a node device in the system diagrammed in FIG. 1.

Here is an explanation of the configurations of the individual devices comprising this system. FIG. 2 shows the configuration of the node devices (12) in this system. The communication paths (13) in the present invention are dual systems comprising a communication system and a loopback system, and the node devices (12) possess receivers (21) and transmitters (24) that support both of these systems, and are equipped with isolators (22) and multiplexers (23) located between these receivers (21) and transmitters (24).

The receiver (21) terminates STS-3C or STM-1 multiplexed modules, and removes the cells carried by the module payloads. Changeover switches (210, 240) that distinguish between communication system and loopback system signals and bypass the loopback system are built into the input side of the isolator (22) and output side of the multiplexer (23). These connect loopback signals directly to the transmitter (24) without passing through the isolator (22) and multiplexer (23).

Cells are sent via the communication system from the center devices (11) to local communication terminals (15) connected to input/output ports ((14)), and among these cells, those cells addressed to the node device (12) in question are transferred by the isolator (22) to the local communication terminals (15) via that node device's (12) input/output ports ((14)).

Meanwhile, cells sent on to the multiplexer (23) are mixed in with cells output from local communication terminals (15) without overlapping, following which they are carried in the payloads of STS-3C or STM-1 multiplexed modules and sent out via the transmitter (2) to the next node device (12). In other words, when cells being sent to center devices (11) from local communication terminals (15) are added to the communication system in the multiplexer (23), controls ensure that these cells are not added to the loopback system.

For example, let us assume that center device 11-2 in FIG. 1 controls node devices 12-4 and 12-5. Control information from center device 11-2 is sent out over the communication paths (13) to node device 12-4. The communication path (13) in this direction is equivalent to the above-described communication system, and the opposite-direction communication path (13) corresponds to the loopback system. Information being sent to center device 11-2 from local communication terminals (15) connected to node device 12-4 is transmitted to node device 12-5 over the communication system's communication path (13).

If center device 11-2 also controls node device 12-6, then this information would be sent on to node device 12-6 via node device 12-5, but in actuality, center device 11-2 control only extends to node device 12-5, so that to send the information to center device 11-2, node device 12-5 performs a loopback operation by changing over to changeover switch 240 and relaying the information to center device 11-2 via the loopback system's communication path (13). When center device 11-2 also controls node devices 12-2 and 12-3 to its left, the communication path (13) running from right to left is the communication system, the communication path (13) running from left to right is the loopback system, and operations are carried out in the same way.

If the communication paths (13) between node devices 12-2 and 12-3 are cut due to a fault, in order for node device 12-3 to send information to center device 11-2 from the local communication terminals (15) connected to the node device (12-3), communication functions are recovered by changing over to the changeover switch (240) and performing a loopback operation. Further, because center device 11-1 will assume control of node device 12-2, node device 12-1, which up until now had been carrying out loopback operations by changing over to the changeover switch (240), reverts back to a status wherein it only uses the ordinary communication system, and node device 12-2 operates the changeover switches (210 and 240).

In addition to the above-described receiver (21), isolator (22), multiplexer (23) and transmitter (24), node device (12) components also include a CPU (26), which controls all the components in the node device (12), a clock (27), a power source (28) and a fault/alarm indication element (25). When a fault occurs and the CPU (26) detects the interruption of signals from upstream, it causes the clock (27) to run on its own and transmits downstream via the multiplexer (23) a cell containing a fault alarm from the fault/alarm indication element (25). When this happens, by using codes peculiar to this particular node device (12) in the VPI/VCI to be utilized, such as this node device's (12) identifying data, it becomes possible for the center devices (11) receiving this data to infer the location of the fault.

Figure 3:
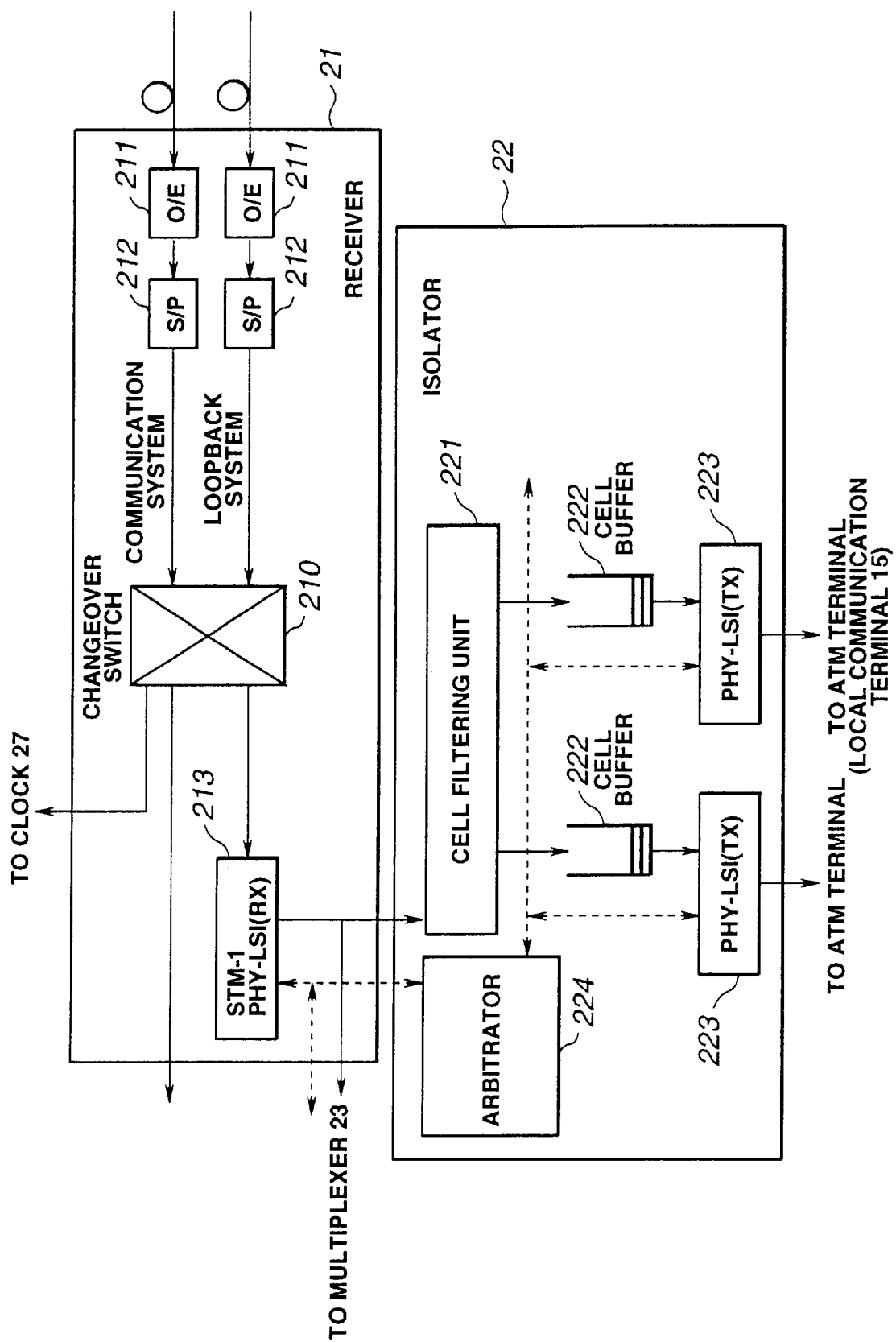
FIG. 3 depicts the configurations of the receiver and isolator components of the node device shown in FIG. 2.

FIG. 3 shows the configurations of the receiver (21) and isolator (22) in a node device (12). The receiver (21) has dual optical-electrical converters (O/E) (211) and serial-parallel converters (S/P) (212) built into the communication system and loopback system, which are connected to a changeover switch (210) that bypasses loopback system signals.

Optical signals carried over an optical fiber, which is the concrete realization means of the communication paths (13), enter the receiver's (21) optical-electrical converter (211), where they are converted to electrical signals, following which, they are converted to parallel signals by the serial-parallel converter (212). In the changeover switch (210), the communication system signals among these parallel signals are sent to the RX (213), and the loopback system signals are transmitted directly to the changeover switch (240 in FIG. 4) in the transmitter (24) without being input to the cell filtering element (221) of the isolator (22).

STS-3C or STM-1 signals are terminated in the RX (213), and the cells carried in the payload are removed. Cells removed in the RX (213) are sent to the isolator (22). The cells enter the cell filtering element (221) first, where those cells addressed to the node device (12) in question are removed, and sent on to the local communication terminals (15) via the cell buffers (222) and TX (223). During the above-described process, cells removed in the receiver's (21) RX (213) are also sent in parallel to the multiplexer (23). In addition, the isolator (22) is also equipped with an arbitration element (224), which carries out signal arbitration processing between the TX (223) in this isolator (22) and the RX (213) in the receiver (21).

Figure 4:
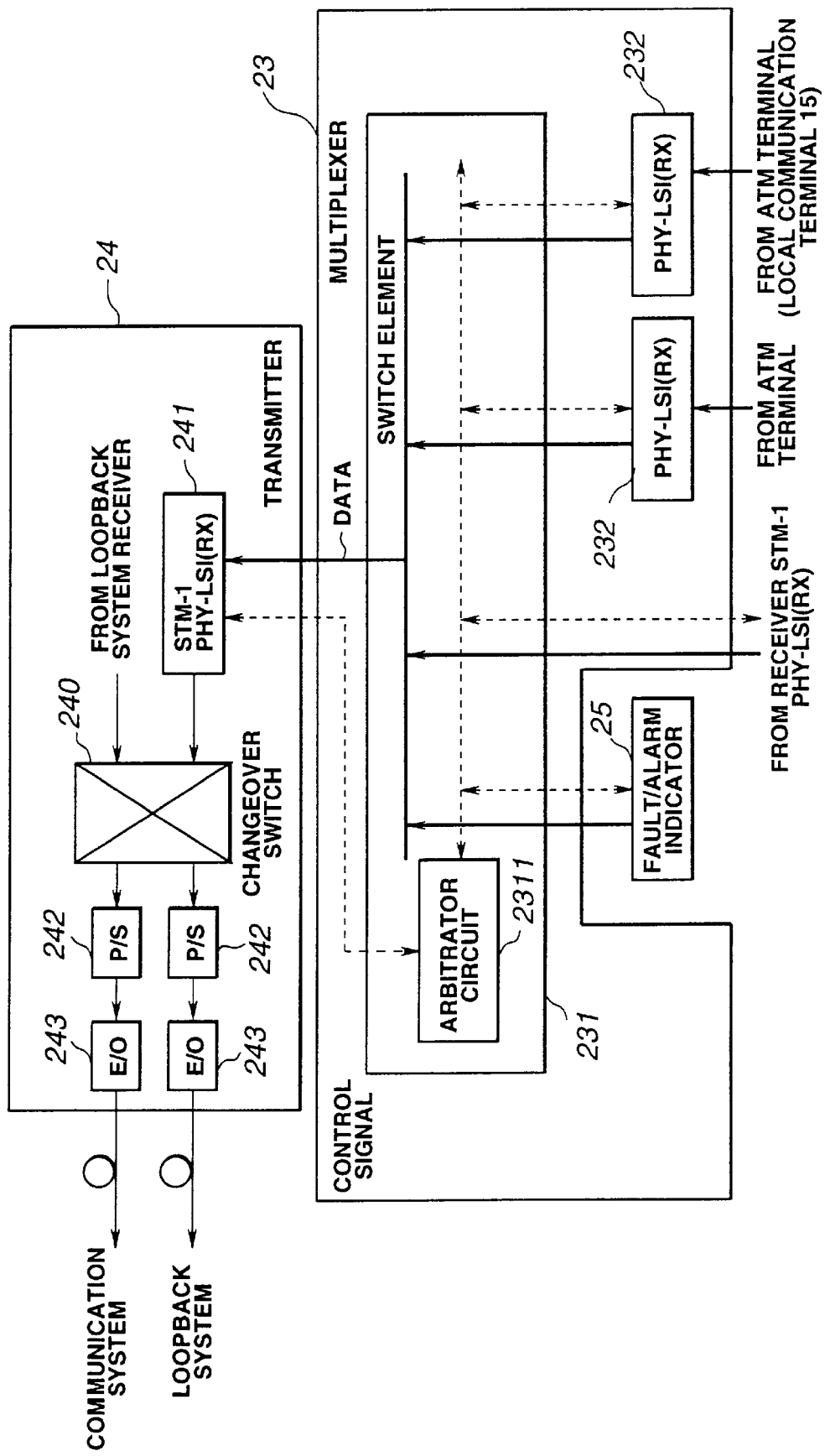
FIG. 4 depicts the configurations of the multiplexer and transmitter components of the node device shown in FIG. 2.

FIG. 4 shows the configurations of the multiplexers (23) and transmitters (24) in the node devices (12). The transmitter (24) is equipped with dual parallel-serial converters (P/S) (242) and electrical-optical converters (E/O) (243) built into the communication system and loopback system, respectively, and these are connected to a changeover switch (240) that changes over the signals from each of these systems. In addition, as one of the signal generators targeted by the changeover switch (240), the transmitter (24) is also equipped with a TX (241) for sending information received from the local communication terminals (15).

The multiplexer (23) is comprised of a switching element (231) and an RX (213). The switching element (231) controls the flow of cells input from the receiver's (21) RX (213), the local communication terminals (15) and the fault/alarm indication element (25) using an arbitration circuit (2311) located at the entrance to the bus, and prevents the cells from colliding on the bus by giving instructions as to which input cells should be output to the bus. In this example, the switching element (231) features a bus-type switch structure, but other systems can also be utilized, such as common buffer-type or self routing-type systems. When signals from upstream are interrupted, the fault/alarm indication element (25) detects this as an abnormality, instructs the clock to run on its own, outputs a fault alarm signal and notifies the center device (11) of the fact that an abnormality occurred and the point where the abnormality took place.

The output from the above-described switching element (231) is sent to the transmitter (24). At the transmitter (24), cells are loaded into the payload segments of STS-3C or STM-1 frames by the TX (241), following which they are converted to serial signals by the parallel-serial converter (242), and these serial signals are then converted to optical signals by the electrical-optical converter (243) and transmitted over the optical fiber.

Figure 5:
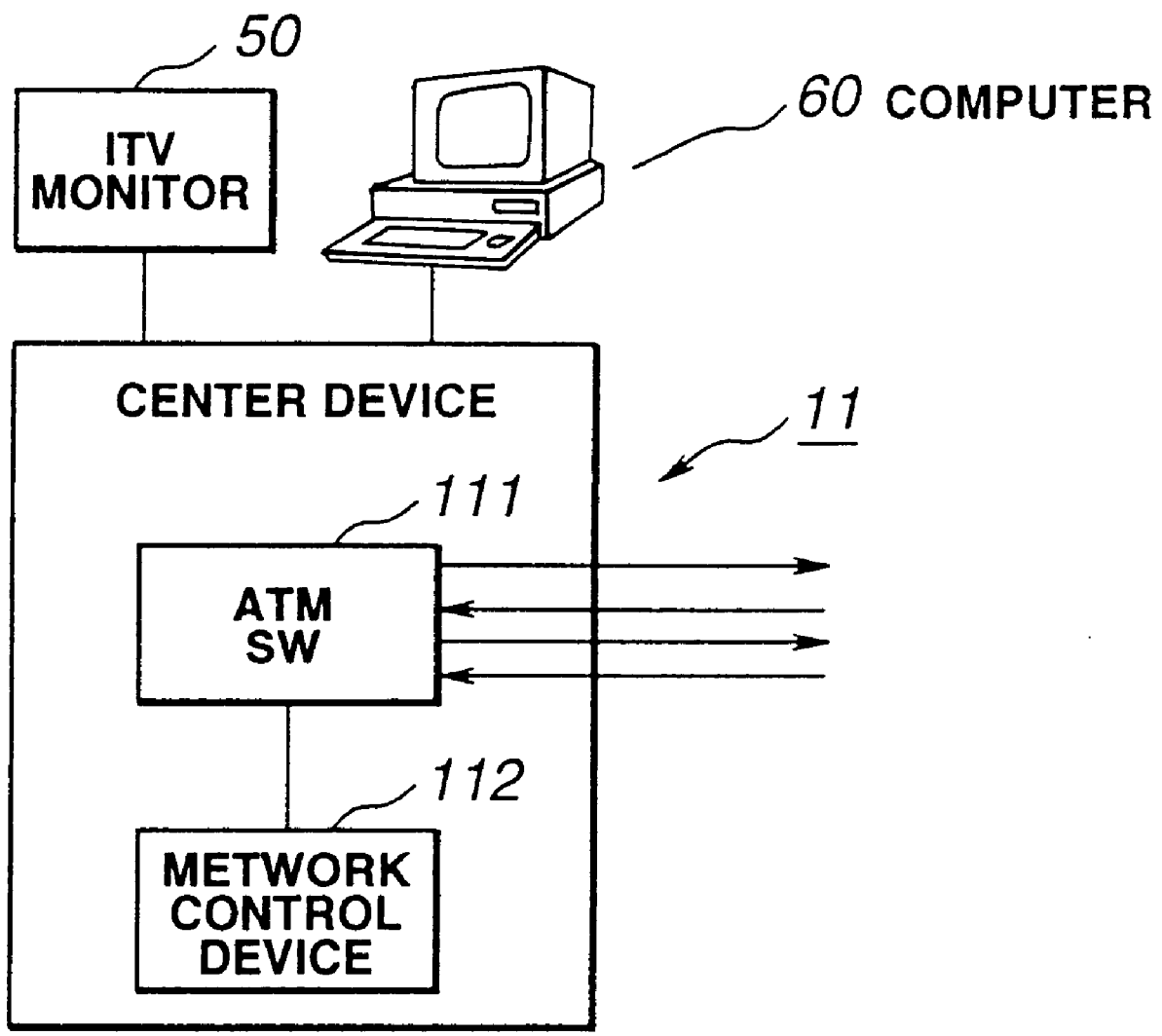
FIG. 5 is a simplified block diagram of a center device in the system diagrammed in FIG. 1.

Next, FIG. 5 is a simplified block diagram of a center device (11) in this system, this center device being comprised of an ATM switch (SW) (111) and a network control device (112). In this example, an ITV monitor ((50)) and a computer ((60)) are connected to the center device's (11) ATM switch (111), but these are not essential. Cells sent via node devices (12) from local communication terminals (15) are sent to the ITV monitor ((50)) and computer ((60)) by way of the ATM switch. Signals sent from the fault/alarm indication element (25) of a node device (12) are sent to the network control device (112), where processing is carried out to detect the point of the fault.

This system, constructed using center devices (11) comprising configurations such as those described above, node devices (12) and communication paths (13) can be used in railroad and other types of management systems. If this system is applied to a railroad management system, for instance, monitoring cameras or signal devices can be set up as local communication terminals (15) at every railroad crossing, and in addition to using the ITV monitor (50) installed in the center device (11) to monitor the required image data obtained from the above-described monitoring camera, the computer (60) installed in the center device (11) can be utilized as needed to furnish the monitoring camera with directional instructions and zoom signals to maintain this monitoring camera in the best possible monitoring position, and/or operational control becomes possible, via which railroad crossing accidents can be discerned from the display of the ITV monitor and the proper control signal sent out to the signal devices, controlling those signals so that the train can be stopped prior to its reaching the site of the accident.

In particular, this system is employed with configurations wherein a plurality of center devices (11) are located within the network, and the three (3) center devices (11-1, 11-2, 11-3) depicted in FIG. 1 control six (6) node devices (12-1, 12-2, 12-3, 12-4, 12-5, 12-6) and one or a plurality of local communication terminals (15) connected to the input/output ports (14) of these various node devices (12).

With regard to the load carried by each center device (11), it is desirable to have flexible control that accords with the system configuration, that is, the layout of the center devices (11) and node devices (12), and the connection status of the communication paths (13), so that, for example, node device 12-1 is controlled by center device 11-1, node devices 12-2, 12-3, 12-4 and 12-5 are controlled by center device 11-2, and node device 12-6 is controlled by center device 11-3.

Conversely, there may be times, depending on what is being managed, when it would be better to use a plurality of center devices (11) to control a single node device (12). For example, because the above-described railroad management system places top priority on safety, when an accident occurs at a certain location, measures must be taken so that trains traveling in that direction can be stopped well in advance of that accident site, in which case, it is better to control a single node device (12) with a plurality of center devices (11).

Now, assume that the system depicted in FIG. 1 is being applied to a railroad management system, and consider the operational control of trains traveling from left to right as we look at the figure. If we assume here that the local communication terminal (15) connected to node device 12-5 is a monitoring camera installed at a railroad crossing, when an accident occurs at this crossing, center device 11-2, which has jurisdiction over this crossing, controls the operation of this monitoring camera to acquire the necessary image data.

In this case, if we assume that the local communication terminal (15) connected to node device 12-1 is a signal device, it would be preferable if center device 11-1, which controls this signal device, is able to monitor the image data generated by the monitoring camera so as to rapidly grasp the situation surrounding the accident further down the tracks.

With regard to requirements of this sort, this system makes it possible for center device 11-1 to control the monitoring camera remotely by enabling the exclusive control measures described below to be carried out at center device 11-1, which has jurisdiction over the signal device, and at center device 11-2, which has jurisdiction over the monitoring camera. This allows center device 11-1 to also rapidly obtain information on a remote site, that is, on the train accident further down the tracks, and thereafter, keeping in mind both the accident information obtained as described above and the train schedule, to be able to smoothly and safely implement train operations by controlling the signal device connected to node device 12-1. The control information and image information data discussed here is transmitted over the communication paths (13) as cells, and the above-described control measures are implemented by the node devices (12), which relay and switch these cells of data between the local communication terminals (15) connected to the node devices themselves and the center devices (11).

Also, to realize the kind of exclusive control described above between center devices 11-1 and 11-2, arbitration must be carried out between these center devices (11), and this arbitration is performed via the communication paths (13). Further, when a fault makes it impossible to communicate over the communication paths (13), communications are maintained via local communication means other than such communication means as the wide area network (16) or leased line communication paths (13) between the center devices (11) in question. In this case, control of the monitoring camera and the acquisition of image data described above is carried out over this local communication means.

Further, this system makes it possible to increase the number of installed local communication terminals (15) connected to the node devices (12), and to increase the number of installed node devices (12) controlled by the center devices (11) as well. The installation of additional equipment can be problematic for center device (11) processing capabilities, but this is dealt with by exchanging system configuration and other control information via the communication paths (13) between the center devices (11) or the wide area network (16) or other local communication means, and altering the configuration control information of the node devices (12) controlled by each of the center devices (11).

Thus, the present invention possesses functions that enable the node devices (12) controlled by each of the center devices (11) to be changed arbitrarily, and, in addition to mandatory changes in response to faults, for example, these changes also take into consideration the load distribution and control convenience of the center devices (11), achieving configurations that allow for flexible changes in the number of node devices (12) that each center device (11) controls.

Here is an explanation of the reason why two (2) of the plurality of center devices (11), center devices 11-1 and 11-3, are positioned at either end of the linear system configuration shown in FIG. 1. Now, assume, for instance, that an earthquake or some other natural disaster has caused damage to the facing communication paths (13) between node devices 12-2 and 12-3. In this case, node device 12-2, which up until now had come under the control of center device 11-2, has been physically cut off from center device 11-2.

With this system configuration, the damage will clearly cut the communication paths (13) on the center device 11-2 side of node device 12-2, but since the communication paths (13) on the center device 11-1 side of this severed location has not been damaged, node device 12-1 and center device 11-1, located on the left-hand side of the figure as you look at it, are capable of communication. If, at this point, center device 11-1 was not positioned at the left end of the linear network, node devices 12-1 and 12-2 would be completely cut off and isolated, but as a result of this systems configuration, in which center device 11-1 is positioned at the left end of the linear network, by having center device 11-1 take over control of node device 12-2, communication can be maintained even in the face of the damage.

FIG. 6 shows a simplified configuration of a communication system related to the second embodiment of the present invention. The only point where this configuration differs from that of the system shown in FIG. 1 is that the center devices (11) and node devices (12) are connected in a loop by the communication paths 13.

By using this loop-shaped connection configuration, this system offers the following advantage not found in the system shown in FIG. 1 with its linear connection configuration. That is, with the system depicted in FIG. 1, for example, communication between center devices 11-1 and 11-2, which connect node devices 12-1, 12-2 and 12-3, are carried out via the communication paths 13, but as a result of the connection configuration being linear, naturally, there is only one communication path (13) between these center devices (11-1, 11-2). Therefore, if a fault should render it impossible to communicate via this communication path 13, communication between center devices 11-1 and 11-2 would have to be carried out via a wide area network (16) or some other local communication means.

By comparison, when the connection configuration is loop-shaped as with the system shown in FIG. 6, the communication paths (13) between center devices 11-1 and 11-2 can take two (2) routes, one that passes through node devices 12-1, 12-2 and 12-3, and another that runs through node devices 12-4, 12-5, 12-6, center device 11-3, and node devices 12-7, 12-8, 12-9 and 12-10. Therefore, even if a fault should occur somewhere along the communication paths (13) through node devices 12-1, 12-2 and 12-3, communication could be rerouted around the fault without necessarily having to go through a wide area network (16) or some other local communication means, that is, via the communication paths (13) that go by way of center device 11-3.

As described above, with the present invention, the center devices (11) control the node devices (12), and this control is achieved by maintaining in advance within the center devices (11) control tables that manage system configuration and other control information. These control tables can be created within the center devices's (11) network control devices (112) (See FIG. 5), for example. Examples of these control tables are shown in FIGS. 7(a) to 7(e). The control tables indicated in the figures are examples of control tables used within the center devices (11) in the system configuration illustrated in FIG. 1, more specifically, FIG. 7(a) corresponds to the control table in center device 11-1, FIG. 7(b) corresponds to the control table in center device 11-2, and FIG. 7(c) corresponds to the control table in center device 11-3.

In view of node device (12) layout and communication path (13) connections, this control table contains a "Node Device Name" that correspond to a "Table No.", and to the right of this "Node Device Name" is entered the "Control Center Device" that controls the node device (12) indicated by the pertinent node device name. The respective center devices (11-1, 11-2, 11-3) control the various node devices (12-1–12-6) on the basis of this information.

In the previously-described switch over of control when a fault occurred between node devices 12-2 and 12-3 in the system depicted in FIG. 1, center devices 11-1 and 11-2, as described below, detected the occurrence of a fault in the communication paths (13) between node devices 12-2 and 12-3, and autonomously changed the contents of their respective control tables to correspond to the proxy control. Examples of the control tables updated by these changes are shown in FIGS. 7(d) and 7(e), respectively. As can be discerned from these figures, by this updating, the "Control Center Device" field corresponding to "Node Device 12-2" for both center devices 11-1 and 11-2 was changed from center device 11-2 to center device 11-1, resulting in contents that support the switch over of control of node device 12-2 from center device 11-2 to center device 11-1.

The detection of the location of a fault by the center devices (11-1, 11-2) described previously can be achieved using a method by which cells addressed so as to return to node devices 12-1, 12-2 and 12-3, respectively, are output from either center device 11-1 or center device 11-2, fixed times are prescribed for each of the node devices (12-1, 12-2 and 12-3), and center device 11-1 or center device 11-2 detects whether or not these cells returned after the above-mentioned fixed intervals.

Also, the control tables shown in FIG. 7 are examples of when the Control Center Device and Node Device Name are entered for each respective center device (11), and more particularly, for center devices 11-1, 11-2 and 11-3. In these examples, when a fault occurs, the center devices (11) can update the control tables without exchanging control table information with the other center devices (11), for instance, if we are talking about the system configuration shown in FIG. 1, without communicating via local communication means such as a wide area network (16).

By comparison, when control of a certain node device (12) is transferred to a different center device (11) for the purpose of lessening the increased load put on center devices (11) in line with the previously-described installation of additional node devices (12), control tables must be updated by exchanging control table information between center devices (11) via a fault-free communication path (13) or local communication means such as a wide area network (16).

Further, as explained earlier in reference to FIG. 1, with regard to controlling monitoring cameras in a railroad management system, when control must span center device 11-2, the control table for center device 11-1 in FIG. 7 (See (a) in this figure) requires information up to node device 12-5, to which this control extends. Also, in this case, a plurality of "Control Center Devices" called 11-1 and 11-2 are entered in the "Control Center Device" field corresponding to each "Node Device Name" 12-5 in control tables in FIGS. 7(a) and 7(b). When a plurality of "Control Center Devices" are entered in a "Control Center Device" field of a control table like this, these plurality of "Control Center Devices" must carry out arbitration in controlling the node device (12) in question.

Further, when a plurality of local communication terminals (15) are connected to a node device (12), this system uses a configuration control table like the one shown in FIG. 8, to which the item "Local Communication Terminal Names" has been added to the control table. As the example given in FIG. 8 indicates, two (2) local communication terminals named 15-8 and 15-9 are connected to node device 12-4, and these local communication terminals (15-8, 15-9) are each controlled separately by center devices 11-2 and 11-3.

Further, when each center device (11) maintains a control table that only lists the node devices (12) that the center device itself controls, when changing the scope of control among these center devices (11), the center devices (11) must communicate with one another via fault-free communication paths (13) or a local communication means such as a wide area network (16). In other words, it is this communication that makes it possible to change the above-mentioned scope of control by exchanging control table information and executing updating processing such as making additions and deletions to the control tables.

Figure 9:
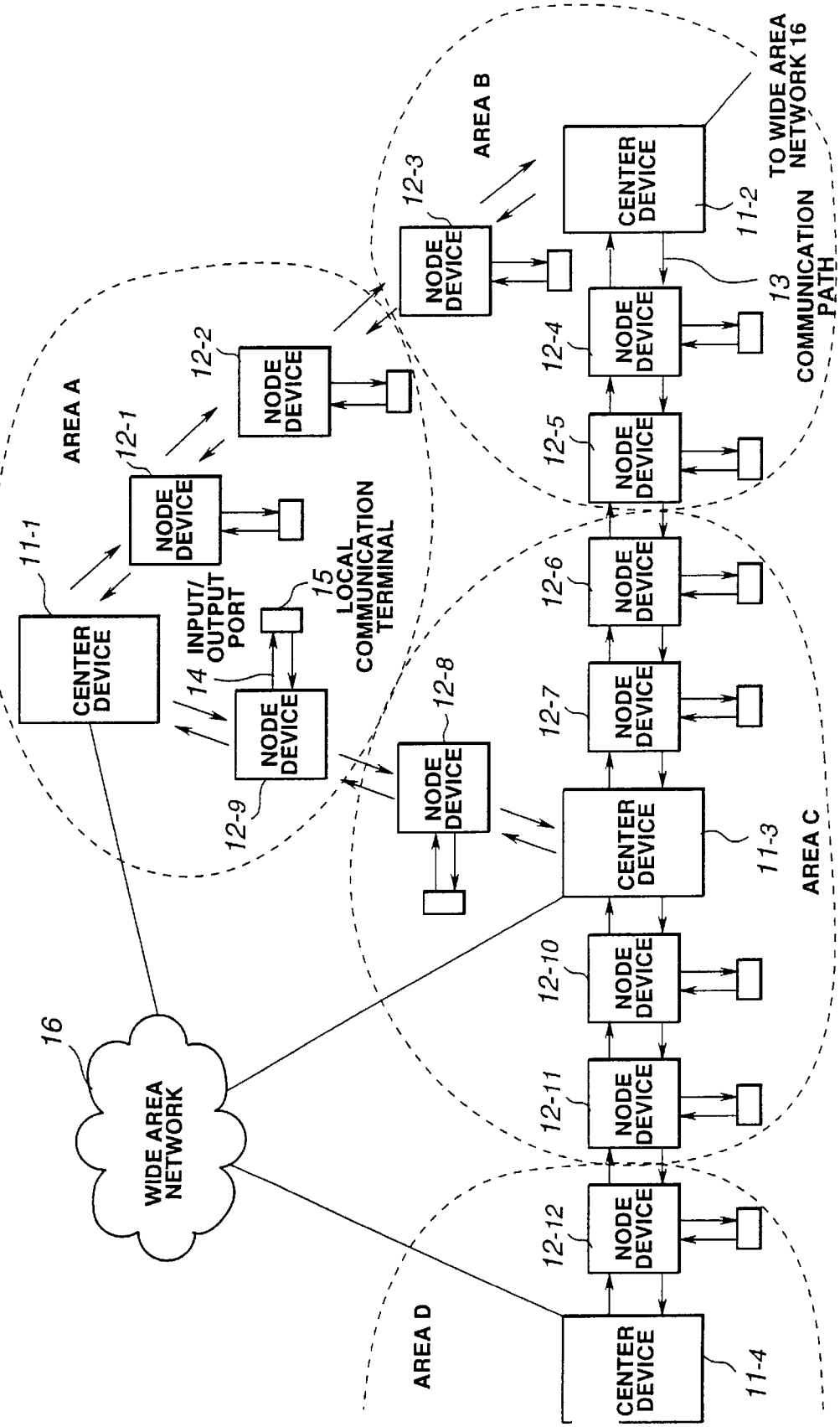
FIG. 9 is a simplified block diagram of a communication system related to the third embodiment of the present invention.

Next, a different embodiment of the present invention is discussed. FIG. 9 is a simple block diagram of a communication system related to the third embodiment of the present invention, comprising a combination of the linear system configuration shown in FIG. 1 and the loop system configuration shown in FIG. 6. In this same figure, for the sake of simplicity, the node devices (12) under the control of each of the center devices (11-1, 11-2, 11-3, 11-4) are divided into areas A, B, C, and D indicated in the figure by dotted lines. The center devices (11-1, 11-2, 11-3, 11-4) inside the various areas A, B, C, D control the various node devices (12) that belong to each of these areas, and the local communication terminals (15) connected to these node devices.

Next is an explanation of the operation of this system. For example, regarding data transmissions within the area A, information obtained by the local communication terminals (15) under the control of center device 11-1 is transmitted as cells of data to the node devices (12) that support these local communication terminals (15). This transmitted data goes by way of these node devices (12), and is transmitted again via the communication paths (13) to center device 11-1, the control center device for these node devices.

Conversely, center device 11-1 processes the data sent via the respective node devices (12) from the various local communication terminals (15) under its control, and after processing additional data from each of the center devices (11) in the other areas, data obtained via the communication paths (13), or the wide area network or other local communication means to which the center devices (11) are interconnected, center device 11-1 transmits to the communication paths (13) cells of data that need to be sent to each of the local communication terminals (15).

The cells of data sent from center device 11-1 are received by each of the node devices (12) under its jurisdiction. From among the cells of data received, each node device (12)

extracts only those cells of data addressed to local communication terminals (15) connected to the associated node device (12), and sends this data to the local communication terminal (15) to which it is addressed. This enables the local communication terminals (15) receiving these data to carry out corresponding operations, such as displaying the received data.

Also, a center device (11) sends data to local communication terminals (15) connected to node devices (12) outside the area, it first transmits the data to a center device in the other area either via the communication paths (13), or via a wide area network (16) or other local communication means to which the center devices (11) are interconnected, then, under the control of the pertinent center device (11), the data is sent to the local communication terminal (15) to which it is addressed. Also, in sending data to a local communication terminal (15) in another area, in addition to executing this data transfer under the control of the center device (11) in the other area, for instance, it is also possible, after the two center devices (11) have completed arbitration, to transmit the data directly to the pertinent local communication terminal (15) in the other area.

Further, with the system configuration shown in FIG. 9, it is also possible to carry out control that extends across areas, as typified by the control of the monitoring camera in the railroad management system shown in FIG. 1. However, with this system, because the communication paths (13) form a loop configuration as shown in FIG. 9, when executing control measures that extend across areas as described above, there is the risk that data addressed to a local communication terminal (15) not on the communication path (13) will continue to circle around on the loop. Therefore, with this system configuration, each center device (11) must store control information for the entire loop-configured network, and must be equipped with functions that do away with unnecessary data such as that described above each time such data is generated.

Figure 10:
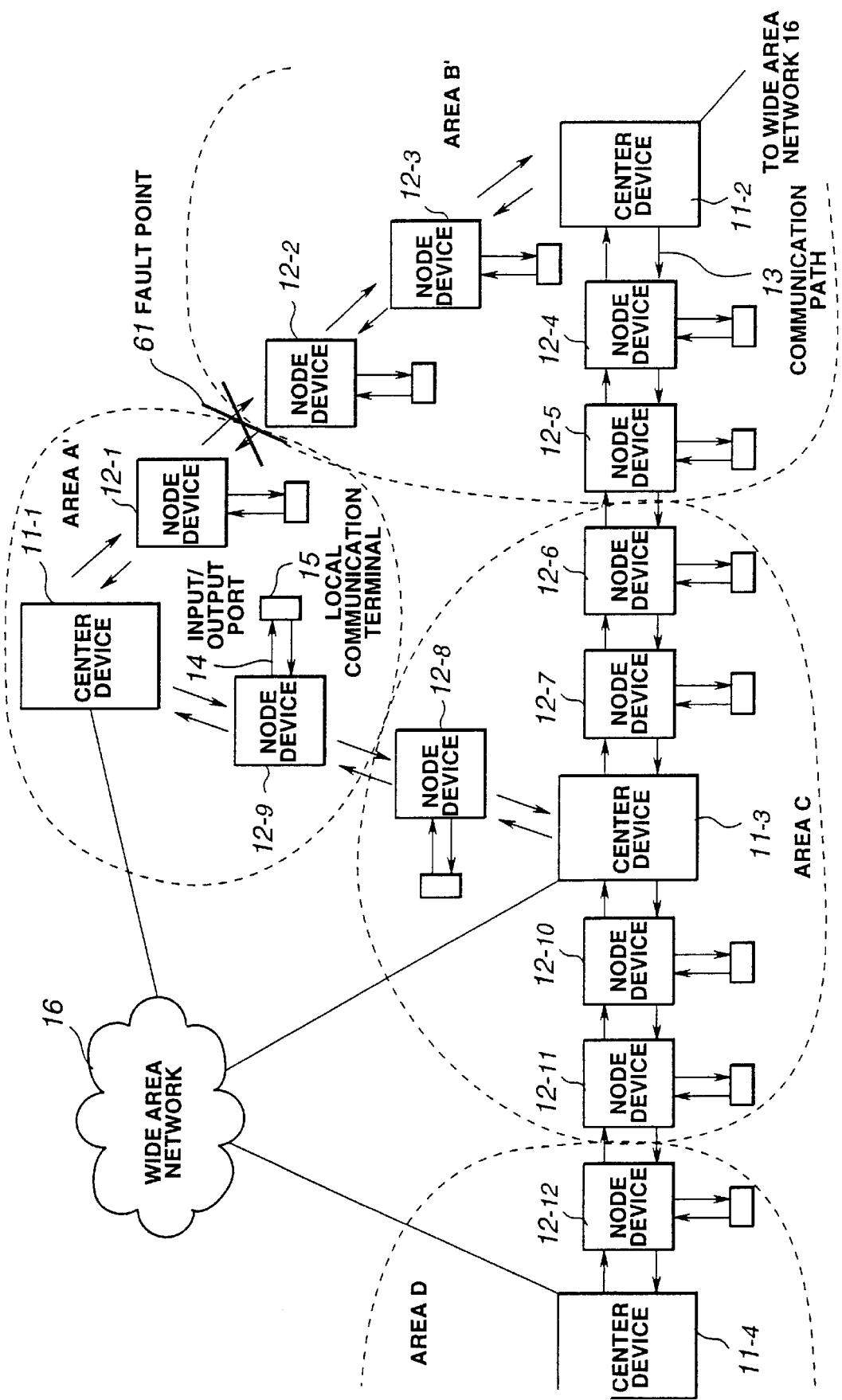
FIG. 10 depicts an autonomous communication functions recovery operation when a fault occurs in the loop communication path segment of the system shown in FIG. 9.

Next is an explanation of operations when a fault occurs in this system. FIG. 10 illustrates the autonomous recovery of communication functions of the communication system shown in FIG. 9 when a fault occurs in the loop-shaped communication paths (13). As shown in the figure, when the communication paths (13) are cut between node devices 12-1 and 12-2 generating fault point 61, node device 12-2, which originally belonged to the area A (See FIG. 9), is cut off and isolated from the normal communication paths (13) with center device 11-1 in the area A by the fault. When this happens, center device 11-1, using the method described below, detects the fault point 61, determines that node device 12-2 is isolated, autonomously recovers communication functions by exchanging fault point information and control information with center device 11-2 of the original area B (See FIG. 9) via either the communication paths (13) that go by way of center device 11-3 in the area C, or a wide area network (16) or other local communication means connecting area A's center device 11-1 with area B's center device 11-2, and transfers control of the isolated node device 12-2 to center device 11-2 in the area B.

Also, if at that time center device 11-2 within the area B is holding control information related to node devices 12-1 and 12-2 within the area A which were connected linearly with area A's center device 11-1, this center device (11-2) within the area B only receives the fault point information, that is, autonomous recovery of communication functions is possible without both center devices (11-1, 11-2) communicating with one another. After recovering communication functions, as shown in FIG. 10, the node devices (12) in the newly-formed areas A' and B' are controlled by the respective center devices 11-1 and 11-2.

Figure 11:
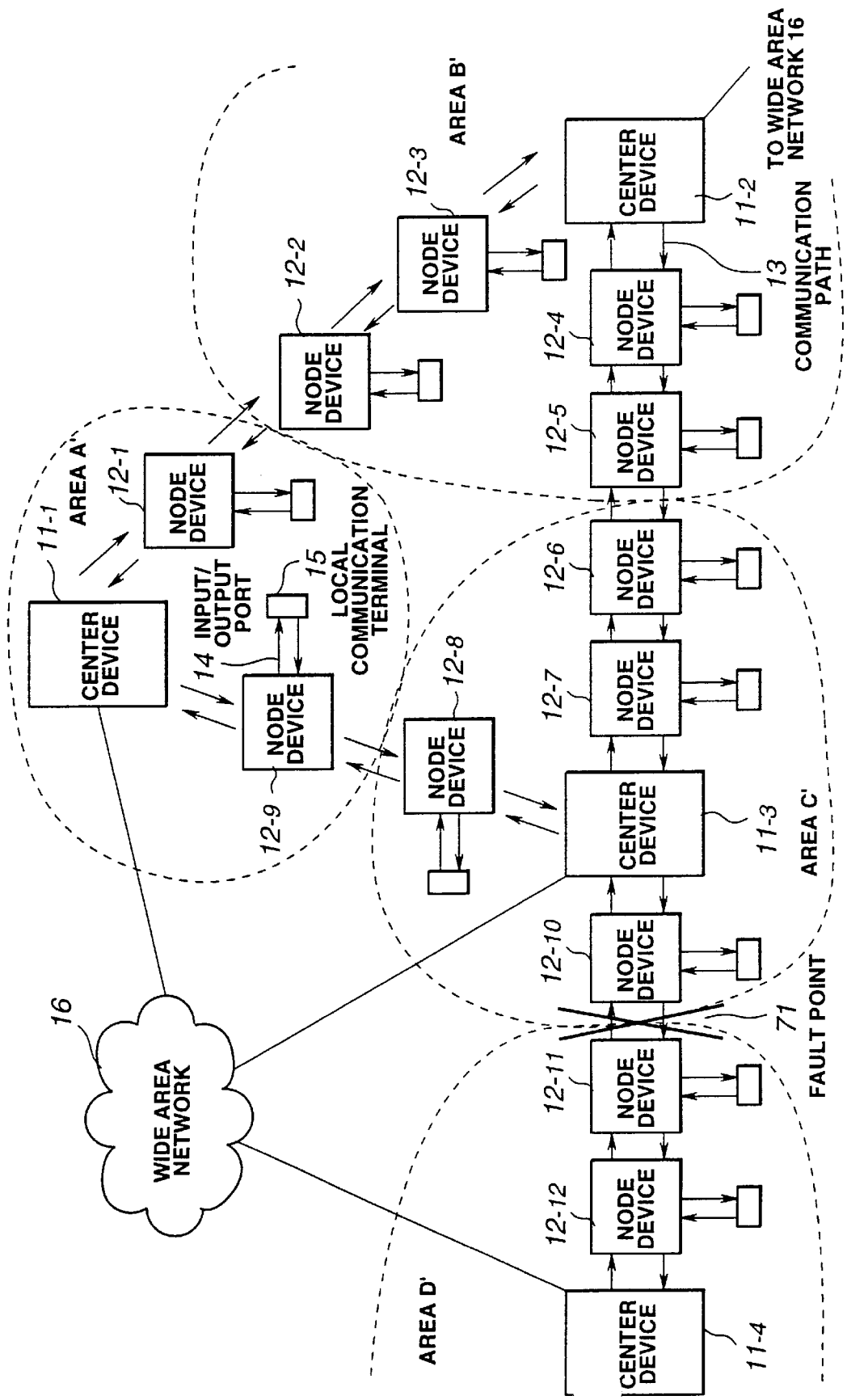
FIG. 11 depicts an autonomous communication functions recovery operation when a fault occurs in the linear communication path segment of the system shown in FIG. 9.

Next, FIG. 11 illustrates the autonomous recovery of communication functions of the communication system shown in FIG. 9 when a fault occurs in the linearly-configured communication path 13. As shown in the figure, when the communication path (13) is cut between node devices 12-10 and 12-11 generating fault point 71, node device 12-11, which originally belonged to the area C (See FIG. 9), is cut off and isolated from the normal communication path (13) with center device 11-3 in the area C by the fault. When this happens, center device 11-3 within the area C, using the method described below, detects the fault point (71), and determines that node device 12-11 is isolated. After that, this center device (11-3) autonomously recovers communication functions by transferring control of node device 12-11 to center device 11-4 within the area D. In this case, because center device 11-3 could not communicate via the communication paths (13) due to the fault point (71), it communicated with center device 11-4 using local communication means such as a wide area network (16).

Further, in this case, when center device 11-4 within the area D is holding control information related to node devices 12-10 and 12-11 within the area C, which were connected linearly with area C's center device (11-3), this center device (11-4) within the area D communicates as-is with center device 11-3 within the area C via the local communication means, and, as described above, is able to autonomously recover communication functions by changing control data and other configuration information, that is, the control tables. After recovering communication functions, as shown in FIG. 11, the node devices (12) in the newly-formed areas C' and D' are controlled by the respective center devices 11-3 and 11-4.

Figure 12:
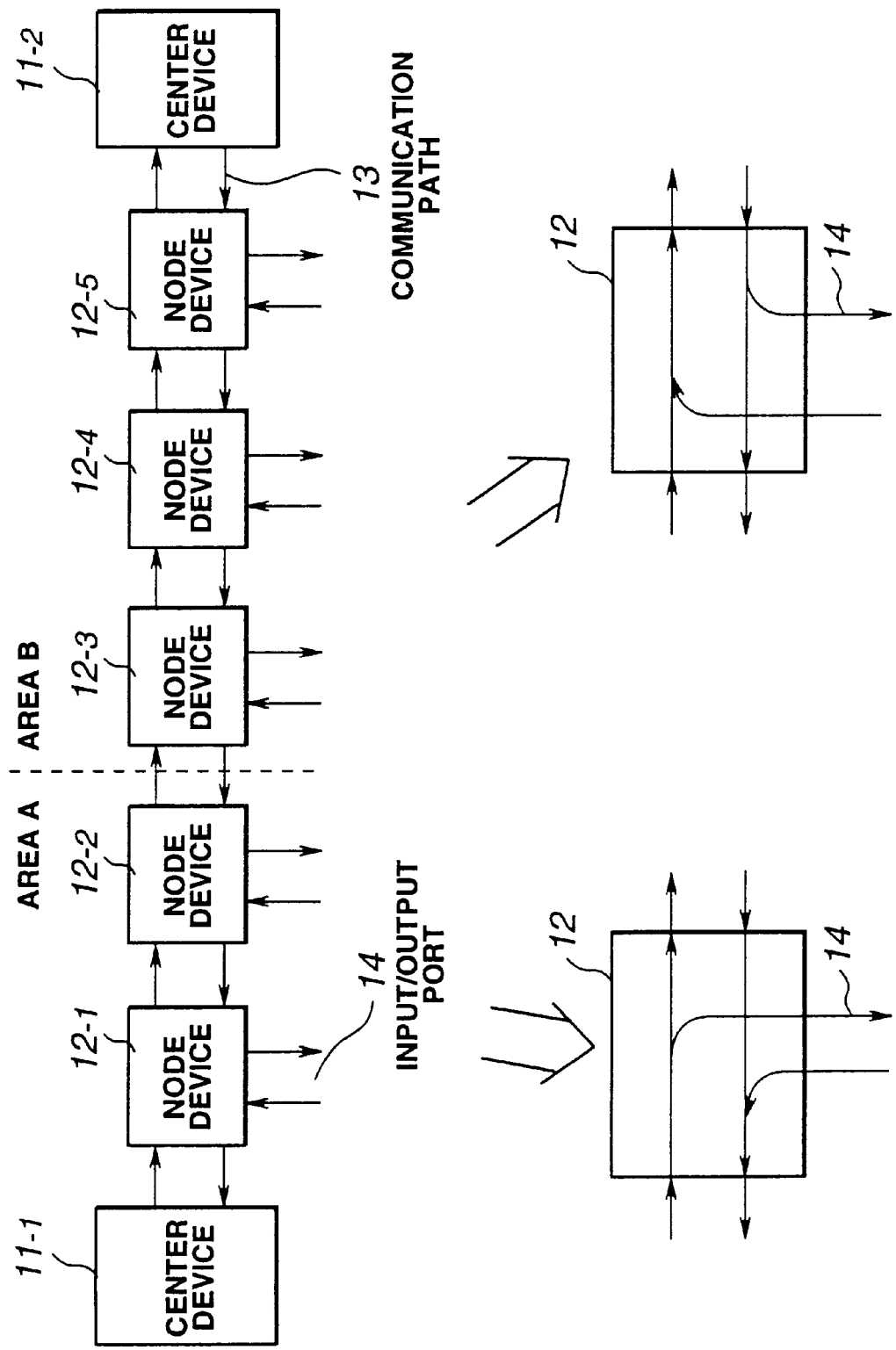
FIG. 12 graphically illustrates the flow of data when the node devices in a system related to the present invention are connected via bus-type communication paths.
Figure 13:
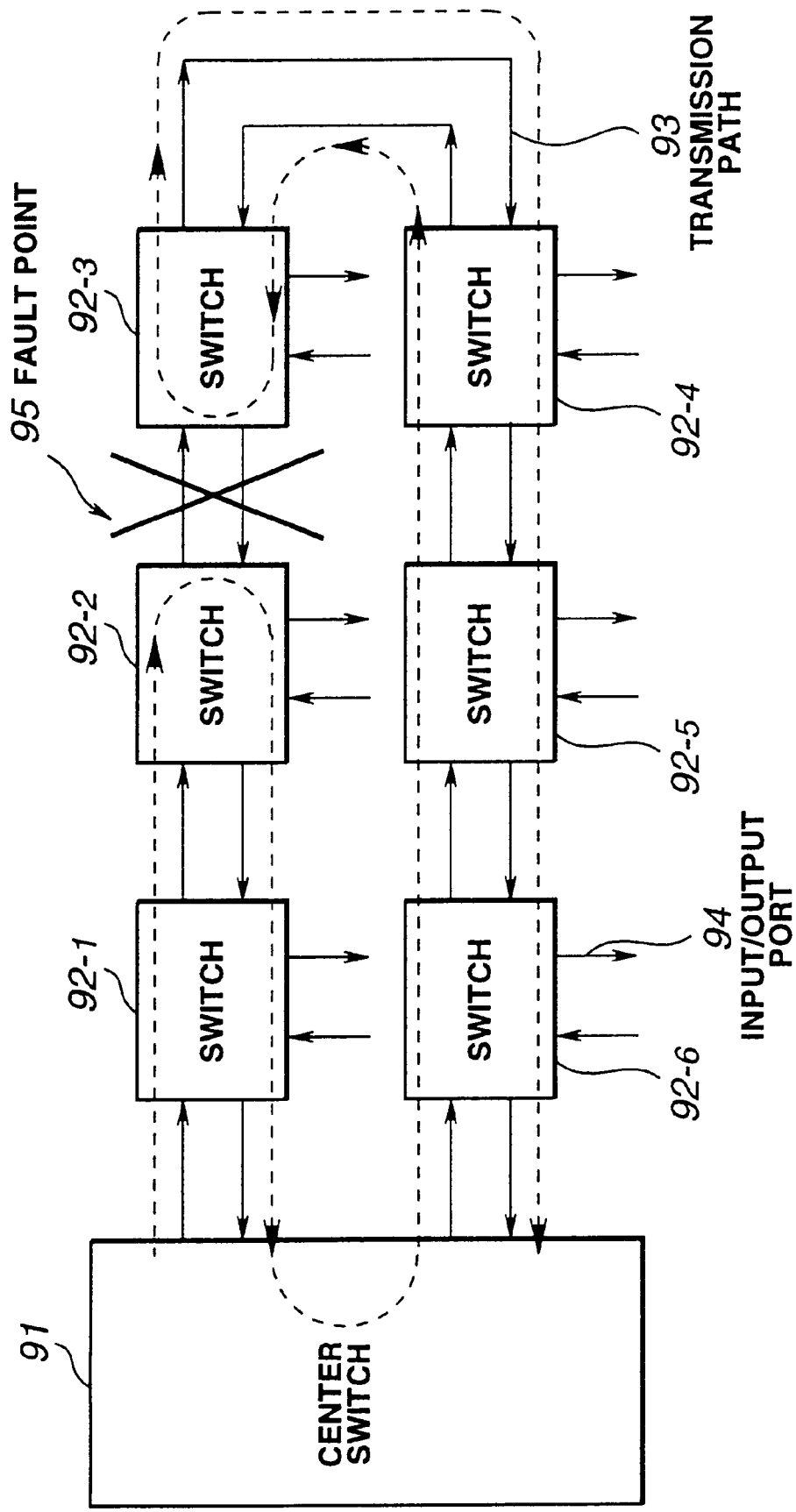
FIG. 13 is a simplified block diagram of a conventional communication system of this type.
Figure 14:
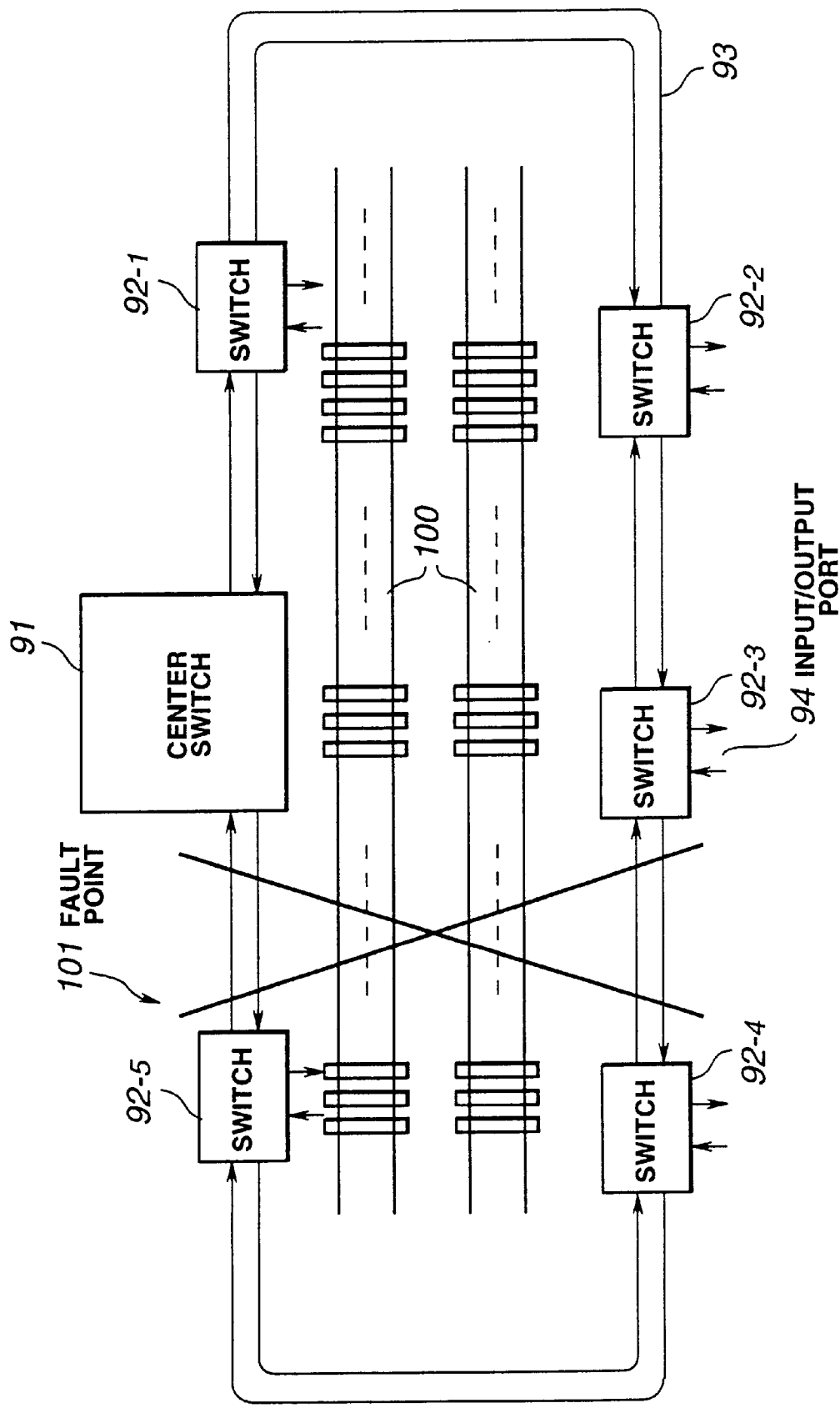
FIG. 14 provides an illustrated example of a conventional communication system applied to a railroad management system.

Next, fault detection and communication functions recovery operations are explained in more detail. Also, for the sake of simplicity, as shown in FIG. 12, this explanation is based on a system configuration in which the node devices (12-1, 12-2, 12-3, 12-4, 12-5) that exist between center devices 11-1 and 11-2 are connected by bus-type communication paths (13). As methods for detecting faults in this case, first, there is a method by which the node devices (12) detect the interruption of cell transmissions from center devices (11) or upstream node devices. In other words, when the communication paths (13) are cut, because cells are not transmitted, to say nothing of the signals themselves, it is possible to recognize an occurrence of a fault by detecting such a state. Further, when the communication paths (13) are normal, and the switching functions of an upstream node device (12) malfunction, since only the transmission of empty cells is sustained, it is also possible to recognize as the occurrence of a fault by the fact that cells other than empty cells do not arrive.

To give a more specific example, the CPU (26) in a node device (12) (See FIG. 2) monitors the transmission status of either the cells or the empty cells, recognizes when cell transmission stops or when cells other than empty cells do not arrive, and this CPU (26) notifies the network control device (112) at the center device (11) (See FIG. 5) that it has detected a fault.

Also, as another method, node devices (12) can constantly transmit fault monitoring cells containing information peculiar to themselves to downstream node devices at fixed intervals, enabling downstream node devices (12) to detect a fault by the fact that the transmission of the fault monitoring cells from an upstream node device (12) has stopped.

Then, a node device (12), upon detecting a fault, transmits fault cells containing information peculiar to itself via specific virtual channels to center devices (11) or downstream node devices (12).

To give a more specific example, when a fault occurs and an interruption in the fault monitoring cells from upstream is detected by the fault/alarm indication element (25) in a node device (12) (See FIG. 2), the CPU (26) causes the clock (27) to run on its own, and sends a fault alarm signal in the form of a cell (fault cell) from the fault/alarm indication element (25) downstream via the multiplexer (23).

When the upstream clock is interrupted by the severing of the communication paths (13) like this, node devices (12) make their internal clocks run on their own, and transmit the above-described fault cells. When a fault occurs, since signals are interrupted to all node devices (12) downstream of that location, these node devices 12 commence the above-described fault cell transmission operations practically all at the same time, generating confusion. Therefore, various types of fault cells arrive in a transient fashion at the network control devices (112) in the center devices (11) (See FIG. 5). However, after a fixed interval, the network control device (112) begins to receive stabilized fault cells. The reason for this, if we take as an example one of the node devices (12) midway between the fault point and the center device (11), is that once signals from upstream are interrupted, this node device starts transmitting fault cells, but after a time, the node device (12) upstream of this node device (12) is carrying out the same operation and the fault cells from that node device begin to arrive. At that point, the node device (12) in question ceases transmitting fault cells, and commences just relaying the fault cells from upstream. In this way, once things settle down to a steady state, only the node device (12) adjacent to the fault point is transmitting fault cells.

Even if the system shown in FIG. (12) is changed to a system wherein the node devices (12-2, 12-3) adjacent to the border between the areas A and B, which are divided by a dotted line, carry out loopback, and the communication path (13) is a loop configuration, by reading the upstream/downstream in the above explanation as upstream/downstream alongside the flow of data in the loop, the fault detection method that utilizes the above-described fault monitoring cells can be used. By using this fault detection method, if, for instance, it was determined that the communication paths (13) between the second node device (12-4) and the third node device (12-5) from the left in the area B was the location of a fault, the two node devices (12-3, 12-4) on the left side of the original area B are transferred to the control of center device 11-1 within the area A.

In this case, the method by which the node devices (12) targeted for change transmit data becomes a problem. With a system configuration that uses a bus-type communication path (13) like that shown in FIG. 12, the flow of data within the node devices (12) in the areas A and B are completely different, as is indicated at the bottom of the figure. That is, for node devices (12) within the area A, data input from the input/output ports (14) flows in the direction of center device 11-1, and for node devices (12) within the area B, this same data flows in the direction of center device 11-2. In brief, the configurations of the node devices within the areas A and B differ. With this point in mind, when a fault occurs, communication functions must be recovered by changing the flow of the above-mentioned data, that is, by changing the configurations of the node devices, or by using the node devices (12-4, 12-5) adjacent to the fault point in the loopback mode. Also, when the communication path (13) is configured in a loop, communication functions can be recovered by making the fault point the loopback point.

Also, as another method of detecting faults, all the node devices (12) constantly transmit to the center devices (11) at fixed intervals fault monitoring cells that contain information peculiar to themselves, and the center devices (11) can also specify the location of a fault by the interruption in the transmission of the fault monitoring cells from upstream node devices (12). In addition, it goes without saying that the present invention, to the extent that it does not deviate from the above-described aims, can be used in a variety of configurations and applications.

As pointed out above, because the present invention connects a plurality of node devices supporting data generating sources to a plurality of center devices via communication paths that use ATM technology, and is configured as if it has distributed ATM switching technology, even when the communication path between a certain center device and the node devices under it control is cut, by transferring control of these node devices to a center device other than the original center device, the reliable and stable autonomous recovery of communication functions can be achieved when a fault occurs due to a disaster or accident.

Further, with the above-described configuration in which the distributed control of a plurality of node devices is performed by a plurality of center devices, because functions have been added which enable configuration control information which stipulates the node devices to be controlled by the various center devices to be conveniently changed separate from the occurrence of the faults, this configuration can be applied to systems requiring control that spans a plurality of center devices, and the scope of that control can be easily changed, making possible, for example, the construction of extremely flexible networks even in the case of railroad and other such management systems.

INDUSTRIAL APPLICABILITY

Under the present invention, since autonomous recovery of communication functions can be reliably and stably achieved by transferring control of a node device that exists on a cut off communication path to a center device other than its original center device, the present invention can be applied to an overall communication system which requires the gathering of operational status information spanning a plurality of center devices, and the ability to respond to the operational states on the basis of the information gathered, and more particularly, is well suited to railroad management systems which must monitor the operations of trains, and which must take reliable steps to stop trains to ensure safety.

We claim:

1. A communication system, comprising:

a plurality of node devices distributed in a plurality of locations;

one or a plurality of local communication terminals connected to each of said node devices;

a plurality of center devices that control said node devices and said local communication terminals that are being under control; and facing communication path means that serially connect said node devices and said center devices, characterized in that said center devices transmit to said communication path means cells of data directed to said local communication terminals targeted for control, said node devices receive said cells of data from said communication path means, extract from the received data in question cells of data addressed to local communication terminals connected to own node device, and output the extracted cells of data to the pertinent local communication terminals, also transmit via said communication path means to said center devices cells of data from said local communication terminals connected to own node device.

2. The communication system of claim 1, wherein the communication path means connects said node devices and said center devices linearly, and at least two (2) of the plurality of said center devices are located at either end of the pertinent linear communication path means.

3. The communication system of claim 1, wherein, the communication path means connects said node devices and said center devices in a loop.

4. The communication system of claim 2 or claim 3, wherein the center devices are interconnected via local communication means, and transmit and receive system configuration and other control information via said communication path means or said local communication means, and comprise means for changing the scope of control over said node devices and said local communication terminals.

5. The communication system of claim 2, wherein the center devices are interconnected via local communication means, and when a fault occurs at a segment of said communication path means, comprise the means for transmitting and receiving fault point information and system configuration and other control information via said local communication means, and for transferring node devices rendered incapable of communicating with a certain center device as a result of said fault to the control of another center device.

6. The communication system of claim 2, further comprising means for detecting the occurrence of a fault in a segment of the communication path means, for interconnecting center devices via local communication means, for transmitting and receiving fault point information and system configuration and other control information via said local communication means, and for transferring node devices rendered incapable of communicating with a certain center device as a result of said fault to the control of another center device.

7. The communication system of claim 2, wherein the center devices are interconnected via local communication means, and, when a fault occurs in a segment of said communication path means, comprise the means for transmitting and receiving fault point information and system configuration and other control information via said communication paths means which have been rerouted around the fault or said local communication means, and for transferring node devices rendered incapable of communicating with a certain center device as a result of said fault to the control of another center device.

8. The communication system of claim 3, further comprising means for detecting the occurrence of a fault in a segment of the communication path means, for interconnecting center devices via local communication means, for transmitting and receiving fault point information and system configuration and other control information via a said communication path means which have been rerouted around the fault or said local communication means, and for transferring node devices rendered incapable of communicating with a certain center device as a result of said fault to the control of another center device.

9. The communication system of claims 5, 6, 7, or 8, wherein the center devices specify the location of said fault based on pertinent node device information-carrying fault cells sent from said node devices.

10. The communication system of claim 9, wherein the node devices comprise means for detecting faults from the interruption of cell transmissions from center devices or upstream node devices, and, when a fault is detected, transmit to center devices or downstream node devices via a dedicated virtual channel fault cells that contain information peculiar to the node devices themselves.

11. The communication system of claim 9, wherein the node devices comprise means for constantly transmitting to downstream node devices at fixed intervals fault monitoring cells that contain information peculiar to the node devices themselves, and for detecting faults from the interruption of said fault monitoring cell transmissions from upstream node devices, and, when a fault is detected, transmit to center devices or downstream node devices via a dedicated virtual channel fault cells that contain information peculiar to the node devices themselves.

12. The communication system of claims 5, 6, 7, or 8, wherein the node devices constantly transmit to center devices at fixed intervals fault monitoring cells that contain information peculiar to the node device themselves, and said center devices specify the location of said fault from the interruption of said fault monitoring cell transmissions from said node devices.

13. The communication system of claim 12, wherein the node devices, center devices, and communication path means are achieved using ATM switch functions.

\* \* \* \* \*

UNITED STATES PATENT AND TRADEMARK OFFICE
CERTIFICATE OF CORRECTION

PATENT NO. : 6,034,944
DATED : March 7, 2000
INVENTOR(S) : Yutaka SEKI et al

It is certified that error appears in the above-identified patent and that said Letters Patent is hereby corrected as shown below:

Title Page, Item [57], in the Abstract, line 14, "11-2)" should read --(11-2)--.

Claim 3, col. 17, line 13, after "wherein", delete ",".

Claim 7, col. 17, line 49, "paths" should read --path--.

Signed and Sealed this

Seventeenth Day of April, 2001

*Attest:*

NICHOLAS P. GODICI

*Attesting Officer*   *Acting Director of the United States Patent and Trademark Office*